(12) United States Patent
Jokitalo

(10) Patent No.: US 8,437,435 B2
(45) Date of Patent: May 7, 2013

(54) CORRELATION COMPUTATION METHOD, DEVICE AND SYSTEM

(75) Inventor: Timo Jokitalo, Helsinki (FI)

(73) Assignee: Fastrax Ltd., Espoo (FI)

( * ) Notice: Subject to any disclaimer, the term of this patent is extended or adjusted under 35 U.S.C. 154(b) by 0 days.

(21) Appl. No.: 13/458,593

(22) Filed: Apr. 27, 2012

(65) Prior Publication Data

US 2012/0275551 A1    Nov. 1, 2012

(30) Foreign Application Priority Data

Apr. 28, 2011  (FI) .................................... 20115406

(51) Int. Cl.
*H03D 1/00*     (2006.01)
*H04L 27/06*    (2006.01)

(52) U.S. Cl.
USPC ........... 375/343; 375/142; 375/143; 375/150; 375/152

(58) Field of Classification Search ................. 375/142, 375/143, 150, 152, 343
See application file for complete search history.

(56) References Cited

U.S. PATENT DOCUMENTS

| 6,731,674 | B1 * | 5/2004 | Yang et al. .................... 375/146 |
| 2004/0136446 | A1 | 7/2004 | Kohli et al. |
| 2005/0135463 | A1 | 6/2005 | Cho |
| 2008/0240031 | A1 * | 10/2008 | Nassiri-Toussi et al. ..... 370/329 |
| 2009/0102852 | A1 * | 4/2009 | Eyvazkhani .................. 345/589 |
| 2009/0207951 | A1 * | 8/2009 | Kim et al. ..................... 375/343 |
| 2010/0306619 | A1 * | 12/2010 | Yang ............................. 714/758 |
| 2011/0216864 | A1 * | 9/2011 | Kim et al. ..................... 375/371 |

* cited by examiner

*Primary Examiner* — Shuwang Liu
*Assistant Examiner* — Sung Ahn
(74) *Attorney, Agent, or Firm* — Potomac Patent Group PLLC

(57) ABSTRACT

An aspect of the invention is a signal processing method for correlation computation between received signal samples, code replica and carrier replica. The method is characterized in that the method comprises steps of: mapping (110) received signal samples into a range of unsigned integers; separating (120) bits of the mapped N-bit sample sequences into N sequences of bits; performing at least one exclusive or (XOR) operation between a sequence of bits and the code; counting (140) number of bits having value 1 in the result of the exclusive or (XOR); remapping (150) the sum back into numeric range of the received signal samples; multiplying the remapped sum by carrier replica; and accumulating (170) the product of multiplication for an interval of at least a code epoch.

10 Claims, 1 Drawing Sheet

CORRELATION COMPUTATION METHOD, DEVICE AND SYSTEM

TECHNICAL FIELD OF INVENTION

The invention relates to a method, device and system for signal processing.

BACKGROUND OF THE INVENTION

Signals transmitted from Global Navigation Satellite System (GNSS) satellites consist of a carrier frequency modulated by a pseudo-random noise (PRN) code that is unique to each satellite.

All the satellites transmit at the same carrier frequency, but due to the high velocity of the satellites the signals will experience a Doppler shift in frequency before reaching the GNSS receiver. The Doppler shift can be several kHz in magnitude.

The pseudo-random noise (PRN) code sequence is 1023 units or chips long and repeats itself continuously. The code phase at the receiver at any given time is dependent on the distance between the receiver and the satellite.

There are several ways of acquiring signals from GNSS satellites. All these methods rely on the effect of autocorrelation, wherein a GNSS receiver will generate exact replicas of a carrier frequency and pseudo-random noise code and multiply these replicas with the incoming signal. If the carrier frequency and code phase of the generated signals match the ones in the incoming signal, it will produce maximum correlation power and the resulting mixed signal is easily detectable.

A straightforward way of acquiring the signals is to do a serial search, i.e. testing with all possible frequencies and code phases. In this case the total number of combinations is over 40,000 for each satellite signal (1023 code phases and 40 frequencies).

Most of the navigation and positioning devices are portable which means that low power consumption is a significant benefit. Signal acquisition and tracking require high amount of calculations which consumes power in a CPU. Any modification that reduces the amount of needed operations and leads to lower power consumption is an improvement to battery life.

OBJECT OF THE INVENTION

One of the objects of the present invention is to provide a method, device and/or system for reducing CPU time or amount of computation needed in processing of a received RF signal of a satellite navigation system.

SUMMARY OF THE INVENTION

The invention discloses a signal processing method, device and system correlation computation between received signal samples, code replica and carrier replica.

The first aspect of the invention is a signal processing method for correlation computation between received signal samples, code replica and carrier replica. The method is characterized in that the method comprises steps of mapping received signal samples from numeric range of the received signal samples into a range of unsigned integers having the same number of bits as the received signal sample; separating bits of the mapped N-bit sample sequences into N sequences of bits which sequences are ordered from most significant to least significant bit and giving a multiplier to each sequence of bits based on bit position in the mapped sample sequence; performing at least one exclusive or (XOR) operation between a sequence of bits and the code replica over predetermined number of samples; counting number of bits having value 1 in the result of the exclusive or (XOR) operation and multiplying the number with the given multiplier of the sequence of bits and summing the products resulted from each sequence of bits for which the exclusive or operation is performed; remapping the sum back into numeric range of the received signal samples; multiplying the remapped sum by carrier replica; and accumulating the product of multiplication for an interval of at least a code epoch.

In an embodiment of the first aspect of the invention, received signal samples are in complex values comprising in-phase (I) sample and quadrature-phase (Q) sample which are both separated individually in the separating step, and the carrier replica is in complex values.

In an embodiment of the first aspect of the invention, after the mapping step the even and odd numbered samples of mapped received signal are separated into individual sample sequences to be processed separately until the last accumulation step, and performing similar separation to the code replica.

In an embodiment of the first aspect of the invention, in the step of performing at least one "exclusive or" operation between a sequence of bits and the code replica over predetermined number of samples, the sequences of bits for which the operation is done are selected based on signal strength of previous correlation computations.

In an embodiment of the first aspect of the invention, in the separating step, the bits separated from sample sequences are reordered in different order from the sample sequence in order to minimize the number of operations needed for the separation, and performing similar reordering to the code replica.

In an embodiment of the first aspect of the invention, in the step of performing at least one "exclusive or" operation between a sequence of bits and the code replica over predetermined number of samples, said predetermined number of samples is determined based on the carrier frequency.

The second aspect of the invention is a signal processing module for correlation computation between received signal samples, code replica and carrier replica. The module is characterized in that the module comprises means for mapping received signal samples from numeric range of the received signal samples into a range of unsigned integers having the same number of bits as the received signal sample; separating bits of the mapped N-bit sample sequences into at least N sequences of bits which sequences are ordered from most significant to least significant bit and giving a multiplier to each sequence of bits based on bit position in the mapped sample sequence; performing at least one exclusive or (XOR) operation between a sequence of bits and the code replica over predetermined number of samples; counting number of bits having value 1 in the result of the exclusive or (XOR) operation and multiplying the number with the given multiplier of the sequence of bits and summing the products resulted from each sequence of bits for which the exclusive or operation is performed; remapping the sum back into numeric range of the received signal samples; multiplying the remapped sum by carrier replica; and accumulating the product of multiplication for an interval of at least a code epoch.

The third aspect of the invention is a device comprising the signal processing module according to the second aspect of the invention.

The fourth aspect of the invention is a positioning system comprising the device of the third aspect of the invention.

The fifth aspect of the invention is a navigation system comprising the device of the third aspect of the invention.

The sixth aspect of the invention is use of the device of the third aspect of the invention as a system element in navigation and/or positioning system.

The invention also includes a system that implements the method disclosed herein.

Some embodiments of the invention are described herein, and further applications and adaptations of the invention will be apparent to those of ordinary skill in the art.

BRIEF DESCRIPTION OF DRAWINGS

In the following, the invention is described in greater detail with reference to the accompanying drawing in which.

DETAILED DESCRIPTION OF THE DRAWINGS

Figure 1:
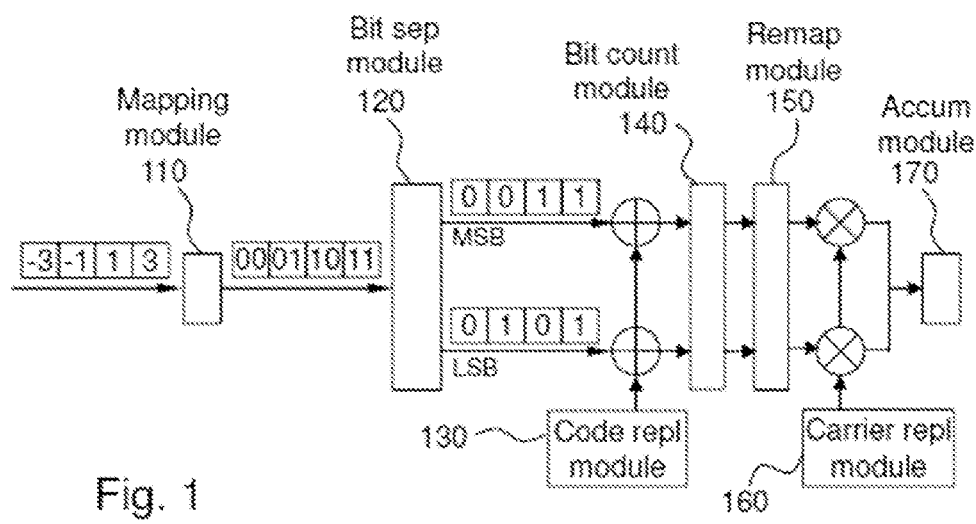
FIG. 1 shows an exemplary schematic diagram of a signal processing module with two bit streams in an embodiment of the invention.

FIG. 1 shows an exemplary schematic diagram of a signal processing module in an embodiment of the invention. A module of this embodiment implementing the illustrated schematic diagram of the FIG. 1 may be used in processing GNSS signals. The module may be implemented by hardware, software or a combination of hardware and software elements.

In an embodiment, an incoming signal is for example in numeric range having four levels: −3, −1, 1 and 3. The incoming signal may be an output from for example RF receiver, analog-digital converter or some other signal processing module, and it can have any range or any number of levels. The incoming signal is mapped from numeric presentation into unsigned binary in mapping module 110. The mapping module outputs unsigned binary words which consist of two binary digits in this example of four incoming signal levels. The binary words would be 3 binary digits for 8 incoming signal levels, 4 binary digits for 16 levels and so on. The mapping is a linear mapping such that when the output unsigned binary word of N bits is considered as an integer in the range from 0 to $2^N-1$, the value 0 corresponds to the minimum value of the input range, and the value $2^N-1$ to the maximum value of the input range. For example, in the above mentioned case of four input levels, the mapping would be "output=(input+3)/2".

Binary words consist of bits which can be denoted by their position so that the leftmost bit is called most significant bit (MSB), next bit to the right is second most significant bit and so on. Respectively, the rightmost bit is called least significant bit (LSB).

In this example, the binary words from the output of the mapping module 110 have only two bits—the most significant bit and the least significant bit. The output of the mapping module 110 is an input for a bit separating module 120. The binary words in the input of the bit separating module 120 are separated into two separate bit streams from outputs of the bit separating module 120. In this example, the bit separating module produces as many output bit streams as there are bits in the input binary words. In the case of two output bit streams, the first bit stream consists of the most significant bits of input words and the second bit stream consists of the least significant bits of input words. The separation of the bit streams can be done, for example, in such a way that the word length of the underlying computer architecture is taken into account. A computer should be understood broadly in this context as a device comprising a microprocessor and means for performing the needed calculations. For example on a 32-bit computer, in the case of two output bit streams, we could notate the first 32-bit samples in the unsigned format as (MSB1, LSB1), (MSB2, LSB2), (MSB3, LSB3), . . . , (MSB32, LSB32). These can be separated into two bits streams (MSB1, MSB2, . . . , MSB32), (LSB1, LSB2, . . . , LSB32). The order of the samples in the separated streams is not significant in the further processing, as long as the same order is observed in the separation of the input stream and the PRN code. On a given implementation, for optimization of the performance, it may be beneficial to use another order of the separated bits.

A code replica module 130 is configured to output replicas of Coarse/Acquisition codes of one or more GPS satellites. The C/A codes as well as their replicas are 1023 bit long pseudorandom binary sequences. The instance of GPS C/A code is used only as an example. The same methods apply to other GNSS signals where the number of bits is different and to signals which are sampled at a higher rate than approximately 1 MHz. The number of bits 1023 is an example which corresponds to the case where the GPS C/A code is used and the sampling rate is one sample per GPS C/A code chip, i.e. approximately 1.023 MHz. The GPS satellites broadcast their unique C/A codes every millisecond. The C/A code and the code replica strongly correlate with incoming signal from the satellite in question when the replica and the incoming signal are aligned perfectly. The code replicas can be stored for example in a table in the code replica module 130. When a certain code replica is needed, it can be chosen from the table and output from the code replica module. Alternatively, the code replicas could be regenerated every time that they are used.

Next, an exclusive or (XOR) operation is performed bitwise and separately between each of the outputs of the bit separating module 120 and the code replica module 130 output. That is, operations are not performed between the output bit streams from the bit separating module 120 themselves but between one output bit stream and code replica.

The resulting bit streams of the XOR operation are inputs for bit counting module 140. The bit counting module counts bits having value 1 and multiplies the result with a corresponding multiplier. The multiplier depends on the position which the bit had in the binary word before the bit separating module 120 separated the binary word into separate bit streams. The multiplier is $2^n$ wherein n is the bit position counted from right to left and starting from zero. For example, the least significant bit has a multiplier of 1, the second most significant bit has a multiplier of 2, the third most significant bit has a multiplier of 4, the fourth most significant bit has a multiplier of 8 and so on. Since zero multiplied with anything is zero the counting of zeros is omitted. So, the outputs of the bit counting module 140 are the sums of 1-bits multiplied with a corresponding multiplier for each incoming bit stream over a certain amount of time or bits.

The summing of bits from the XOR operation results into a single summed value is done over a predetermined number of bits. This number of bits depends on the carrier frequency of the original signal. The described method in effect makes an approximation, assuming that the carrier phase is constant during the summation interval. In reality this is not true but if the summation interval is short enough then the loss due to the approximation is acceptable. It is preferable to use a larger number of bits because bit counting can be done more efficiently for longer sequences of bits. On some computers, the counting of bits can be done with one instruction for one memory word, and there are also software bit counting methods which are quicker to execute for longer bit sequences. But if the number of bits is too large, the output values will cancel out because the carrier phase is not sufficiently close to a constant. The number of bits summed into one value should not be larger than half of the carrier wavelength. Preferably it should be less than ¼ wavelengths. It is also preferable to choose the number of summed bits as a multiple of the computer word because then the summing corresponds well to the layout of the bits in the computer memory.

As an example, if the carrier replica frequency is 5000 Hz, the wavelength is ⅕₀₀₀ seconds. Then in the case where the sampling rate is approximately 1.023 MHz, a preferable choice of number of bits could be 32, because (1023000/5000)/32=6.4, approximately, which means that 32 bits corresponds to about ⅙.₄ wavelengths. The performance loss with this amount of summing is acceptable in most applications and the processing of 32 bits together can be done efficiently on a typical 32-bit computer architecture.

Next, the output sums of the bit counting module 140 are remapped back into original signal representation in a remapping module 150. For example, if the original signal before the mapping module 110 was a signed integer having values between −3 and 3 the remapping module 150 remaps the sum of an input to an output in that range. The remapping is the inverse of the linear mapping which was done to convert the input signal range into the unsigned representation. In the example case of input signal range −3, −1, 1, 3, where the mapping was "output=(input+3)/2", the inverse mapping would be "output=sum*2−3".

Next, the outputs from the remapping module 150 are multiplied with a replica of a carrier from a carrier replica module 160. The carrier replica is a piecewise constant approximation of a complex or real signal. The values can be obtained for example by a method based on an NCO (numerically controlled oscillator) or on table lookup.

The product of the carrier replica and outputs of the remapping module 150 are accumulated in an accumulating module 170 over a certain interval. The results from the accumulating module 170 can be fed onwards to code and carrier tracking loops. These tracking loops can be basic GNSS tracking loops such as those described in common GNSS literature. The accumulating interval in the accumulating module 170 is preferably at least one code epoch which in GPS system equals to 1023 code chips or about a millisecond in time. Shorter accumulation intervals can also be used but then the noise of the signal increases because the entire code epoch duration is not accumulated. This can be acceptable if the tracking loops perform their own smoothing of the signal, or if the incoming signal is clear and strong. Longer accumulation intervals can also be used and then the data rate to the tracking loops will diminish. A drawback with longer accumulation times can be that the receiver's performance will degrade with strong dynamic, i.e. strong accelerations of the receiver.

In case the incoming signal is a clear and strong signal the processing of LSB bit stream can be omitted without affecting the performance of the receiver too much. When half of the bits are omitted the amount of CPU time is significantly reduced which leads to lower power consumption.

Figure 2:
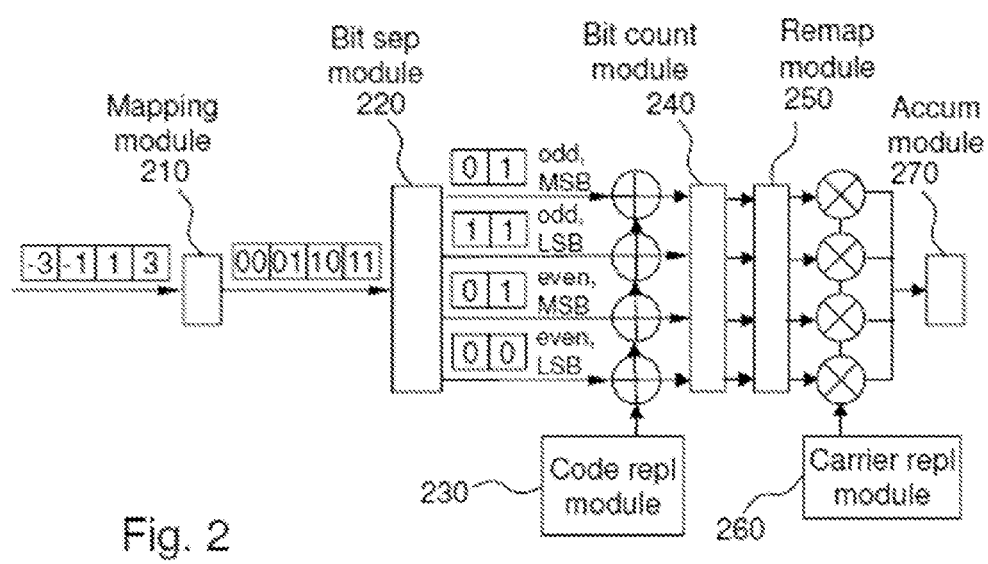
FIG. 2 shows an exemplary schematic diagram of a signal processing module with four bit streams in an embodiment of the invention.

FIG. 2 shows another exemplary schematic diagram of a signal processing module in an embodiment of the invention. A module of this embodiment implementing the illustrated schematic diagram of the FIG. 2 may be used in processing GNSS signals. The basic functions are similar to the module of FIG. 1 but the number and content of bit streams may be different. The module may be implemented by hardware, software or a combination of hardware and software elements.

In this embodiment, an incoming signal is for example in numeric range having four levels: −3, −1, 1 and 3. The incoming signal may be an output from for example RF receiver, analog-digital converter or some other signal processing module, and it can have any range or any number of levels. The incoming signal is mapped from numeric presentation into unsigned binary in mapping module 210. The mapping module outputs unsigned binary words which consist of two digits in this example of four incoming signal levels. The binary words would be 3 digits for 8 incoming signal levels, 4 digits for 16 levels and so on.

In this example, the binary words from the output of the mapping module 210 have only two bits—the most significant bit and the least significant bit. The output of the mapping module 210 is an input for a bit separating module 220.

The binary words in the input of the bit separating module 220 are separated into four separate bit streams from outputs of the bit separating module 220. In this example, the bit separating module produces twice as many output bit streams as there are bits in the input binary words. The output has two pairs of bit streams—odd bit streams and even bit streams. Odd pair of bit streams consists of words arriving to the bit separating module 220 first, third, fifth, seventh and so on. Even pair of bit streams consists of words arriving to the bit separating module 220 second, fourth, sixth, eighth and so on. The odd and even pairs are further separated into total of four output bit streams: odd MSB, odd LSB, even MSB and even LSB. The separation of bits is done similarly to the first described embodiment, but with four output streams instead of two.

In another embodiment the bit separating module may separate the input to as many output bit streams as necessary. For example, a bit separating module could separate every fourth input word to a separate output. With 4-bit words this would lead to a bit separating module with 16 outputs: $1^{st}$, $5^{th}$ and $9^{th}$ words would have MSB, $2^{nd}$ MSB, $3^{rd}$ MSB and LSB outputs; $2^{nd}$, $6^{th}$ and $10^{th}$ would also have MSB, $2^{nd}$ MSB, $3^{rd}$ MSB and LSB outputs, and so on.

In another embodiment the incoming signal contains complex values. The complex signal is demodulated in IQ demodulator within the mapping module or the bit separating module into separate I (in-phase) and Q (quadrature) signals. These I and Q signals both form their own bit streams that are processed like any other bit stream. In this embodiment the replica code and the carrier replica are also complex and/or demodulated into I and Q bit streams.

In another embodiment the bit separating module reorders separated bits so that the bits in the $n^{th}$ word are not the $n^{th}$ bits in the output. Reordering of the bits of the output bit streams can be used for minimizing the number of operations needed for the separation. When the order of bits is changed, similar change in order of bits of code replica has to be made to the code replica in the code replica module. The reordering does not change the externally observed behavior of the module, because the result of the bit summing is independent of the ordering of the bits. However, the XOR is done before the summing, therefore both bit sequences which are used as inputs to the XOR have to be ordered in the same way.

Next, in the embodiment of FIG. 2, a code replica module 230 is configured to output replicas of Coarse/Acquisition codes of one or more GPS satellites. The C/A codes as well as their replicas are 1023 bit long pseudorandom binary sequences. The GPS satellites broadcast their unique C/A codes every millisecond. The C/A code and the code replica strongly correlate with incoming signal from the satellite in question when the replica and the incoming signal are aligned perfectly. The code replicas can be stored for example in a table in the code replica module 230. When a certain code replica is needed, it can be chosen from the table and output from the code replica module.

Next, an exclusive or (XOR) operation is performed bit-wise and separately between each of the outputs of the bit separating module 220 and the code replica module 230 output. In this case, the odd bits of the replica code are used for odd MSB and odd LSB XOR operations and even bits for even MSB and even LSB. The XOR operation is performed over a predetermined number of bits. The number of bits depends on carrier frequency of the original signal.

The resulting bit streams of the XOR operation are inputs for bit counting module 240. The bit counting module counts bits having value 1 for and multiplies the result with a corresponding multiplier. The multiplier depends on the position which the bit had in the binary word before the bit separating module 220 separated the binary word into separate bit streams. The multiplier is $2^n$ wherein n is the bit position counted from right to left and starting from zero. For example, the least significant bit has a multiplier of 1, the second most significant bit has a multiplier of 2, the third most significant bit has a multiplier of 4, the fourth most significant bit has a multiplier of 8 and so on. Since zero multiplied with anything is zero the counting of zeros is omitted. So, the outputs of the bit counting module 240 are the sums of 1-bits multiplied with a corresponding multiplier for each incoming bit stream over a certain amount of time or bits.

Next, the output sums of the bit counting module 240 are remapped back into original signal representation in a remapping module 250. For example, if the original signal before the mapping module 210 was a signed integer having values between −3 and 3 the remapping module 250 remaps the sum of an input to an output in that range.

Next, the outputs from the remapping module 250 are multiplied with a replica of a carrier from a carrier replica module 260. Again, the odd bits of the carrier replica are used for odd MSB and odd LSB XOR operations and even bits for even MSB and even LSB.

The product of the carrier replica and outputs of the remapping module 250 are accumulated in an accumulating module 270 over a certain interval. The interval is preferably at least one code epoch which in GPS system equals to 1023 bits or about a millisecond in time.

In case of strong incoming signal the processing of odd or even bit stream pair can be omitted without affecting the performance of the receiver too much. If the incoming signal is very strong also the LSB bit stream of the remaining odd/even bit stream pair may be omitted while maintaining acceptable performance. Omitting odd words completely and LSBs of the even words means that only one fourth of bits are processed. This means that CPU time and power consumption are roughly one fourth compared to processing of all the bits.

In an embodiment of the invention, the device comprising the signal processing module can be a part of a positioning or navigation system. The device can be for example a GNSS receiver comprising the signal processing module according to an embodiment of the invention. The GNSS receiver receives positioning signals from a satellite navigation system and processes the received signals with said signal processing module. The receiver may be arranged to transmit location data to another device of the navigation and/or positioning system, for example to a display unit or to a system in a vehicle in which the receiver is being used.

Although some embodiments or examples have been described in connection with the Global Positioning System (GPS), the presented inventive concept may be utilized in connection with various present and future satellite navigation systems, for example, such as GLONASS, Galileo, COMPASS, etc.

To a person skilled in the art, the foregoing exemplary embodiments illustrate the model presented in this application whereby it is possible to design different methods and arrangements, which in obvious ways to the expert, utilize the inventive idea presented in this application.

The invention claimed is:

1. A signal processing method for correlation computation between received signal samples, a code replica, and a carrier replica, comprising:
   mapping received signal samples from a numeric range of the received signal samples into a range of unsigned integers having a same number of bits as the received signal samples;
   separating bits of mapped N-bit sample sequences into at least N sequences of bits that are ordered from a most significant bit to a least significant bit, and giving a multiplier to each sequence of bits based on bit position in the mapped sample sequence;
   performing at least one exclusive-or (XOR) operation between a sequence of bits and the code replica over a predetermined number of samples;
   counting a number of bits having a value 1 in a result of the XOR operation, multiplying the number of bits having a value 1 with the given multiplier of the sequence of bits, and summing products resulting from each sequence of bits for which the XOR operation is performed;
   remapping a sum of the products back into the numeric range of the received signal samples;
   multiplying the remapped sum by the carrier replica; and
   accumulating a product of the multiplying the remapped sum by the carrier replica for an interval of at least a code epoch.

2. The method of claim 1, wherein received signal samples are complex values comprising in-phase (I) sample values and quadrature-phase (Q) sample values that are both separated individually in the separating, and the carrier replica is in complex values.

3. The method of claim 1, wherein after the mapping, even and odd numbered samples of mapped received signal samples are separated into individual sample sequences that are processed by the method separately until the accumulating; and even and odd numbered samples of the code replica are separated into individual sample sequences that are processed by the method separately until the accumulating.

4. The method of claim 1, wherein performing at least XOR operation between a sequence of bits and the code replica over a predetermined number of samples includes selecting the sequence of bits based on signal strength of previous correlation computations.

5. The method of claim 1, wherein separating bits of mapped N-bit sample sequences into at least N sequences of bits includes reordering bits separated from sample sequences into different orders to minimize a number of operations needed for separating, and reordering bits separated from the code replica into a different order to minimize a number of operations needed for separating.

6. The method of claim 1, wherein in performing at least one XOR operation between a sequence of bits and the code replica, the predetermined number of samples is determined based on a frequency of the carrier.

7. A signal processing module for correlation computation between received signal samples, a code replica, and a carrier replica, comprising:
- a sample mapper configured for mapping received signal samples from a numeric range of the received signal samples into a range of unsigned integers having a same number of bits as the received signal samples;
- a bit separator configured for separating bits of mapped N-bit sample sequences into N sequences of bits that are ordered from a most significant bit to a least significant bit and giving a multiplier to each sequence of bits based on bit position in the mapped sample sequence;
- an exclusive-or (XOR) device configured for performing at least one XOR operation between a sequence of bits and the code replica over a predetermined number of samples;
- a counter configured for counting a number of bits having a value 1 in a result of the XOR operation, a first multiplier configured for multiplying the number of bits having a value 1 with the given multiplier of the sequence of bits, and a summer configured for summing products of the first multiplier that result from each sequence of bits for which the XOR operation is performed;
- a remapper configured for remapping a sum of the summer back into the numeric range of the received signal samples;
- a second multiplier configured for multiplying a remapped sum by the carrier replica; and
- an accumulator configured for accumulating a product of the second multiplier for an interval of at least a code epoch.

8. A device, comprising a signal processing module for correlation computation between received signal samples, a code replica, and a carrier replica, comprising:
- a sample mapper configured for mapping received signal samples from a numeric range of the received signal samples into a range of unsigned integers having a same number of bits as the received signal samples;
- a bit separator configured for separating bits of mapped N-bit sample sequences into N sequences of bits that are ordered from a most significant bit to a least significant bit and giving a multiplier to each sequence of bits based on bit position in the mapped sample sequence;
- an exclusive-or (XOR) device configured for performing at least one XOR operation between a sequence of bits and the code replica over a predetermined number of samples;
- a counter configured for counting a number of bits having a value 1 in a result of the XOR operation, a first multiplier configured for multiplying the number of bits having a value 1 with the given multiplier of the sequence of bits, and a summer configured for summing products of the first multiplier that result from each sequence of bits for which the XOR operation is performed;
- a remapper configured for remapping a sum of the summer back into the numeric range of the received signal samples;
- a second multiplier configured for multiplying a remapped sum by the carrier replica; and
- an accumulator configured for accumulating a product of the second multiplier for an interval of at least a code epoch.

9. The device of claim 8, wherein the device is included in a positioning system.

10. The device of claim 8, wherein the device is included in a navigation system.

* * * * *